United States Patent
Siebenga

(10) Patent No.: US 9,591,807 B1
(45) Date of Patent: Mar. 14, 2017

(54) CONTINUOUS SQUARE BALER

(71) Applicant: Charles Siebenga, Bozeman, MT (US)

(72) Inventor: Charles Siebenga, Bozeman, MT (US)

( * ) Notice: Subject to any disclaimer, the term of this patent is extended or adjusted under 35 U.S.C. 154(b) by 0 days.

(21) Appl. No.: 15/067,096

(22) Filed: Mar. 10, 2016

(51) Int. Cl.
*A01F 15/10* (2006.01)

(52) U.S. Cl.
CPC ............ *A01F 15/10* (2013.01); *A01F 15/101* (2013.01); *A01F 2015/102* (2013.01); *A01F 2015/107* (2013.01); *A01F 2015/108* (2013.01)

(58) Field of Classification Search
CPC .... A01F 15/10; A01F 15/101; A01F 15/0858; A01F 15/00; A01F 15/14; A01F 2015/102; A01F 2015/107; A01F 2015/108
USPC ........... 100/3, 4, 7, 19 R, 33 R, 76, 80, 179, 100/188 R, 189; 56/341
See application file for complete search history.

(56) References Cited

U.S. PATENT DOCUMENTS

| | | | |
|---|---|---|---|
| 1,494,007 A | 5/1924 | Murray | |
| 3,922,838 A | 12/1975 | Kline et al. | |
| 4,273,034 A | 6/1981 | Molitorisz | |
| 4,455,930 A | 6/1984 | Crawford | |
| 4,490,968 A | 1/1985 | Cysewski | |
| 4,803,832 A | 2/1989 | Crawford | |
| 4,926,749 A | 5/1990 | Neale et al. | |
| 4,962,632 A * | 10/1990 | Schoonheere | A01F 15/101 100/142 |
| 4,999,987 A * | 3/1991 | Eggenmueller | A01F 15/04 100/189 |
| 8,875,625 B2 | 11/2014 | Siebenga | |
| 2012/0000377 A1 * | 1/2012 | Verhaeghe O.M. | A01F 15/0825 100/45 |

* cited by examiner

*Primary Examiner* — Jimmy T Nguyen
(74) *Attorney, Agent, or Firm* — Oppenhuizhen Law PLC; David L. Oppenhuizen

(57) ABSTRACT

A feeding mechanism for a crop baler having a quick feeding device including hay guides which can be deflected by a semi cylinder compression mechanism. The hay guides guide the hay into the bale chamber. A cutting device is provided to divide the continuously fed hay into segments of hay to be placed above and below the compression roller. The mechanism also includes a method of storing a segment of hay while the baler binds the bale in the bale chamber with twine. The mechanism stores hay at the precise time the baler binds the bale in the bale chamber and clears the storage area while the next bale is being made. The mechanism will slow the speed of the semi cylinder, quick feed, leaf stopper cutter, and knotter needle system when binding a bale to allow the baler to operate at a higher speed when not binding the bale.

18 Claims, 5 Drawing Sheets

CONTINUOUS SQUARE BALER

BACKGROUND OF THE INVENTION

The present invention pertains to a baler for collecting and baling crops. More particularly, the present invention pertains to a feed mechanism for a baler for collecting and baling crops.

The present invention is directed to an improved feed mechanism for the baler disclosed in U.S. Pat. No. 8,875,625, which is hereby incorporated by reference in its entirety.

The operation of the baler described in U.S. Pat. No. 8,875,625 proved a substantial amount of hay was not being compressed into the bale chamber. The hay was not directed into the bale chamber by the rake fingers, and instead was eject out of the baler due to gravity or the force of air that was created by the movement of the semi cylinder.

This baler also required a mechanism to adjust the timing of the semi cylinder to the flaker cart. This apparatus added expense and complication to the machine. The prior art also used stuffer fingers to lifted the hay into the leaf forming chamber. This method did not work effectively and slowed the operation of the baler. The prior art did not cut the hay being fed into the baler into sections, but merely pulled them apart. This did not create definite segments of hay which led to hay being ejected into the wrong places.

The prior art baler also did not have a definite way of storing hay while a bale was being tied in the bale chamber which led to a delay in the forward motion of the baler.

SUMMARY OF THE INVENTION

An improved way to place a segment of hay in the compression area has been created by using a quick feeding device to place a segment of hay above and below the semi cylinder compression device. The segment of hay that has been placed into the compression area is contained by two different guides and two gates that open and close in synchronization with the movement of the semi cylinder. The guides are identical in shape with one guide placed to guide the hay into the compression area as the semi cylinder moves up.

The other guide is positioned to guide the hay into the compression area as the semi cylinder moves down. The guides are in three sections. The first section is permanently attached to the frame of the baler and guides the hay until the leading edge of the semi cylinder reaches a gate. The closed gate then guides the hay until the leading edge of the semi cylinder reaches the second section of the guide. The second section of the guide then continues to guide the hay into the bale chamber until the leading edge of the semi cylinder reaches the third section of the guide which is permanently attach to the front edge of the bale chamber. The third section of the hay guide is slotted to allow the needles to pass through during the tying operation.

The second section of the guide is pivotally connected to the frame of the baler to allow it to move out of the way as the semi cylinder travels the final distance to compress the hay into the bale chamber. The second section of the guide is returned to its original position by gravity in the upper hay guide and by springs in the bottom hay guide. The springs are connected to the pivoting arms in such a way to force it home once the semi cylinder has traveled out of the way.

The pivoting gates are operated by cams attach to the main crank shaft of the semi cylinder. The cams are designed to open and close the gates in synchronization with the semi cylinder. Once a segment of hay has been placed in the compression area either above or below the semi cylinder, one of the gates closes. The upper gate closes when a segment of hay has been placed below the semi cylinder and the bottom one closes when a segment of hay has been place above the semi cylinder. The gate remains closed until the leading edge of the semi cylinder has moved passed the gate, then the gate opens. This action allows for a segment of hay to be place into the compression area each time the semi cylinder moves up or down.

The quick feeding device is of the same operation as used in most large square balers to place a segment of hay in front of a plunger. The quick feeding device is repositioned to lift and place a segment of hay in the middle of the bale being created when the semi cylinder is either up or down. The spikes on the quick feed apparatus are used to move the hay and go through slots in the bottom of the leaf forming chamber and in the bottom gate to position the hay forward enough so that when the gates close all of the segment of hay will be forced into the compression area. The quick feed mechanism completes two cycles for each cycle of the semi cylinder, placing a segment of hay below the semi cylinder and then above the semi cylinder.

A leaf stopper cutter apparatus has been created that will cut the flow of continuous hay in the leaf forming chamber right in front of the quick feed mechanism as it starts to engage the hay. This leaf stopper cutter apparatus is controlled by a cams connected to a shaft that is operating the same speed as the shaft that drives the quick feed apparatus. The cams force the leaf stopper cutter apparatus into the leaf forming chamber stopping and cutting the continuous flow of hay. The leaf stopper cutter apparatus is retracted from the leaf forming chamber by springs. A mechanism has been created to keep the cutting apparatus engage during the tying of the bale which will stop a segment of hay from being placed below the semi cylinder when the needles are engaged to tie off the bale.

The stuffer fingers are used to force the hay into the leaf forming chamber from the pickup similar to other large square balers. In order to store hay the stuffer finger pivotal control bar is rotated around the center of the drive shaft for the stuffer fingers. When the stuffer finger pivotal control bar is rotated towards the back of the baler the stuffer fingers do not push the hay as far forward into the leaf forming chamber thereby creating a hay storage area. The stored hay is pushed out of the area by slowly moving the stuffer finger pivotal control bar forward over the course of a number of quick feed cycles. This bar is moved by a hydraulic actuator controlled by a computer programmed to move the stuffer finger pivotal control bar the right distant at the right time. The computer causes the actuator to move substantially backward while the baler is tying off a bale. The computer moves the bar incrementally forward after the bale has been tied to rid the storage area of the hay that has been accumulated during the tying process.

The storage area capacity is large enough to accumulate the hay that is being fed into the baler by its forward progress while the baler is tying off a bale. It accumulates the section of leaf that would normally be placed under the semi cylinder as well as the amount of that is not being moved into the compression area do to the slower speed of the quick feed, leaf cutter stopper, semi cylinder and knotter-needle mechanism (the middle baler) during the tying operation. The speed of the middle baler is slowed down by a transmission placed between the baler input shaft and the shafts that power the quick feed, leaf cutter stopper, semi cylinder and knotter-needle mechanism. This transmission slows the speed of the middle baler while allowing the pickup and stuffer finger to operate at full speed. The limiting factor for the speed of a baler is the speed at which the knotter needle mechanism will operate. The transmission must slow the speed of the knotter needle mechanism to where it will function for just the period it is operating to minimize the amount of hay that must be stored to keep the forward progress of the baler constant even while tying off a bale. This is done by a computer controlled transmission that will shift the transmission to the right speed at just the right time and back again. The neutral position of the transmission is used to cease operation of the middle baler when mechanisms are out of sync as describe in U.S. Pat. No. 8,875,625.

According to a first embodiment of the present invention, there is provided a square baler comprising:

a wheeled frame having a front end and a rear end, the front end having a hitch adapted for connecting the baler to a powered wheeled vehicle such that the vehicle is capable of pulling the baler through a field surface filled with crop;

the front end further comprising an inclined surface having a lower edge located near the field surface such that as the baler is pulled over the field surface the crop is forced up the inclined surface;

a leaf forming chamber mounted above the wheeled frame rearward of the inclined surface and forward of a bale chamber, the leaf forming chamber including a gate at a rearward end of the leaf forming chamber, the gate being selectively opened to permit crop to pass into the bale chamber from the leaf forming chamber, or selectively closed to not permit crop to pass into the bale chamber from the leaf forming chamber;

a semi cylindrical compression roller slidably and rotatably mounted on a vertical mount structure located at the front of the bale chamber, the roller having a curved face with an arc length which is substantially as long as the height of the bale chamber;

the roller being slidable between a low position near a bottom of the bale chamber, a high position near a top of the bale chamber, and a middle position located halfway between the high position and the low position and about level with a midpoint of the height of the of bale chamber;

the roller being rotatable such that when it is located in the low position, the curved face is directed substantially upward, when it is located in the middle position the curved face is directed substantially rearward, and when it is located in the high position the curved face is directed substantially downward;

whereby as the roller is slid upwardly from the low position toward the high position while the baler is being pulled forward, the curved face rotates from the upward facing direction through the rearward facing direction and to the downward facing direction, and whereby as the roller is slid downwardly from the high position toward the low position while the baler is being pulled forward, the curved face rotates from the downward facing direction through the rearward facing direction and to the upward facing direction;

a feed mechanism adapted for moving piles of crop from the leaf forming chamber into the front of the bale chamber;

whereby when the roller is positioned below the middle position, the feed mechanism moves a first pile of crop to a location above the curved face, and then, as the roller moves upwardly, the curved face compresses the first pile of crop rearwardly and upwardly in the bale chamber; and whereby when the roller is positioned above the middle position, the feed mechanism moves a second pile of crop to a location below the curved face, and then, as the roller moves downwardly, the curved face compresses the second pile of crop rearwardly and downwardly in the bale chamber.

According to a second embodiment of the present invention, there is provided a method of loading hay into a bale chamber and forming a square bale of hay comprising the steps of:

moving a continuous feed supply of hay from an inclined pickup surface to a leaf forming chamber, the hay being driven up the inclined pickup surface by a plurality of rotating stuffer fingers;

entering a leaf stopper cutter into the leaf forming chamber to cut a first pile of hay from the continuous feed supply of hay;

engaging a feed mechanism to feed the first pile of hay from the leaf forming chamber to a bale chamber, the bale chamber having a rotating, semi-cylindrical compression roller, the roller being positioned in an upper position such that the first pile of hay enters the bale chamber below the roller;

exiting the leaf stopper cutter from the leaf forming chamber;

closing a gate positioned at a rearward end of the leaf forming chamber to close off the bale chamber from the leaf forming chamber;

lowering the roller from the upper position to a lower position and rotating the roller in such a manner that the first pile of hay is compressed downwardly and rearwardly in the bale chamber;

entering the leaf stopper cutter into the leaf forming chamber to cut a second pile of hay from the continuous feed supply of hay;

opening the gate;

engaging the feed mechanism to feed the second pile of hay from the leaf forming chamber to the bale chamber, the second pile of hay entering the bale chamber above the roller which is in the lower position;

closing the gate to close off the bale chamber from the leaf forming chamber; and raising the roller from the lower position to the upper position and rotating the roller in such a manner that the second pile of hay is compressed upwardly and rearwardly in the bale chamber.

For a more complete understanding of the present invention, reference is made to the following detailed description and accompanying drawings. In the drawings, like reference characters refer to like parts throughout the views in which:

DETAILED DESCRIPTION OF THE
PREFERRED EMBODIMENTS OF THE
PRESENT INVENTION

Figure 1:
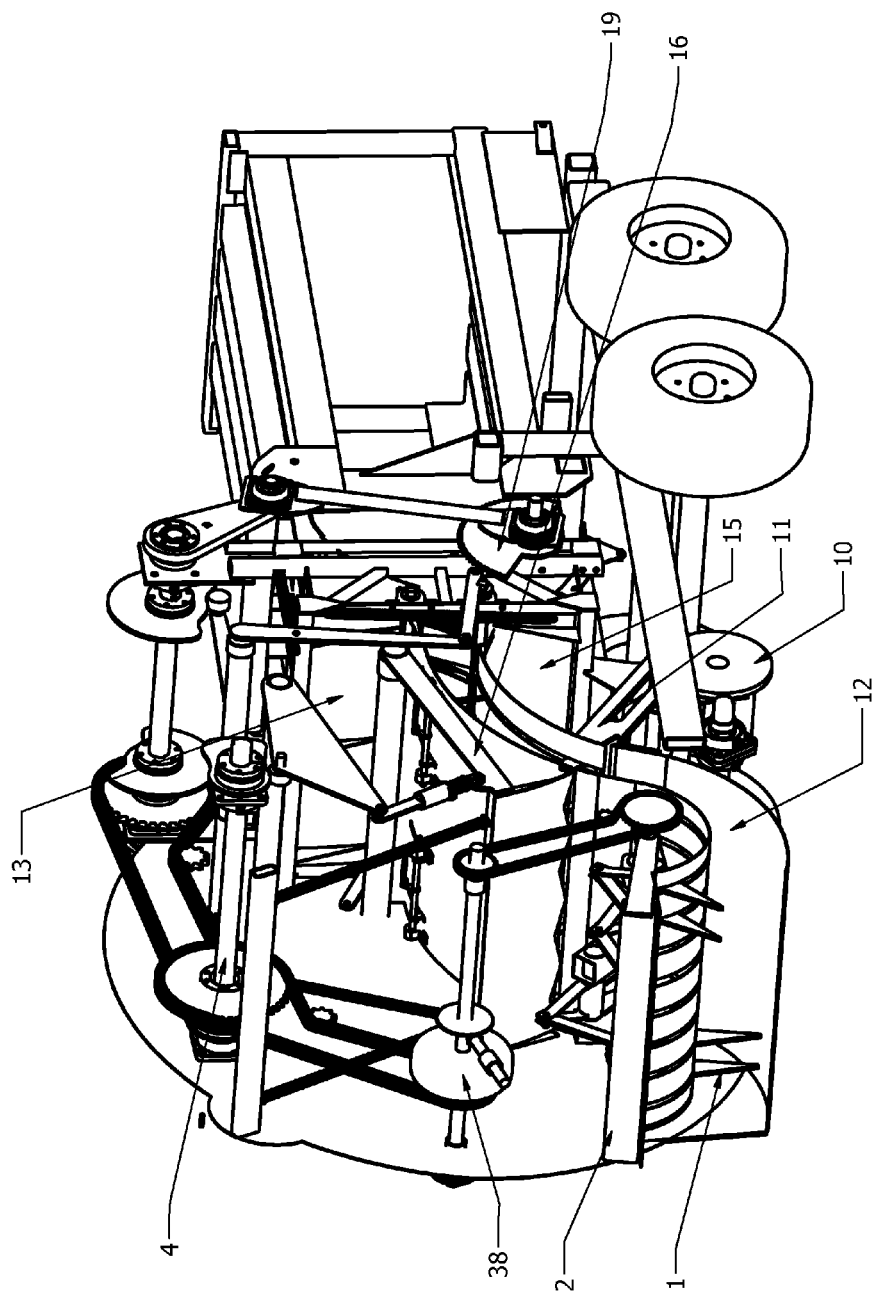
FIG. 1 is an isometric view of the baler with one side panel removed.

FIG. 1 shows the baler innovations with the left mechanism holder panel removed. The left mechanism panel and right mechanism panel 9 hold the position of the shaft bearings and other pivoting and stationary components in place. The mechanism panels are a mirrored imaged of each other based on a plane through the center of the baler from front to back and top to bottom. The preferred embodiments comprising of a leaf forming chamber 12 to carry the hay from the pickup to the center of the movement of the semi cylinder roller 19. The pickup is an inclined surface having a lower edge located near the field surface such that as the baler is pulled over the field surface the hay is forced up the inclined surface. The leaf forming chamber 12 initially creates the continuous leaf by the stuffer fingers 1 pushing hay into the leaf forming chamber 12 from the pickup. The pickup being attached to the front of the baler in a normal way to lift the hay off the ground and deliver it to stuffer fingers 1. The initial part of the leaf forming chamber 12 having a top part with slots to allow the stuffer fingers to project through and gather hay from the pickup and push it into the leaf forming chamber 12 and towards the back of the baler as the configuration of the leaf forming chamber 12 lifts the hay and directs it to the center of the movement of the semi cylinder roller 19. The middle part of the leaf forming chamber 12 having a cutting edge, or blade, in the bottom of the leaf forming chamber 12 to allow for the cutting of the leaf with the aid of the leaf stopper cutter 16. The last part of the leaf forming chamber 12 having a slotted bottom to allow the spikes of the quick feed mechanism 11 to go through to move the hay from the leaf stopper mechanism to the center of bale being formed in the bale chamber. The movement of the quick feed mechanism 11 is such that it moves the segment of hay created by the engagement of the leaf stopper cutter 16 to the compression area quickly while the semi cylinder roller 19 is traveling through the top or bottom of its movement.

Once the hay is in the compression area, hay guides and gates are used to guide the hay into the compression area as the cylinder moves up and down. The lower hay guide 13 and the upper gate 23 direct the hay into the compression area while the semi cylinder roller 19 moves down. The upper hay guide 15 and lower gate 22 direct the hay into the compression area while the semi cylinder roller 19 moves up.

Figure 2:
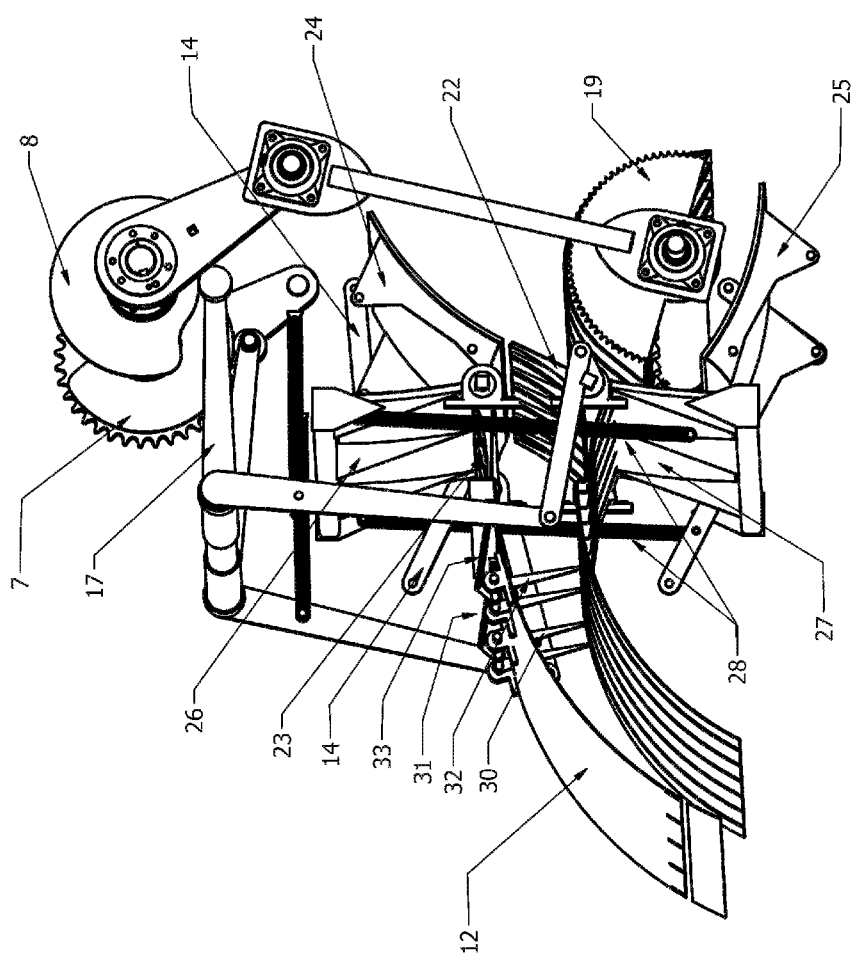
FIG. 2 shows the position and displacement of the hay guides, as well as the gates and cams used to operate the baler.
Figure 3:
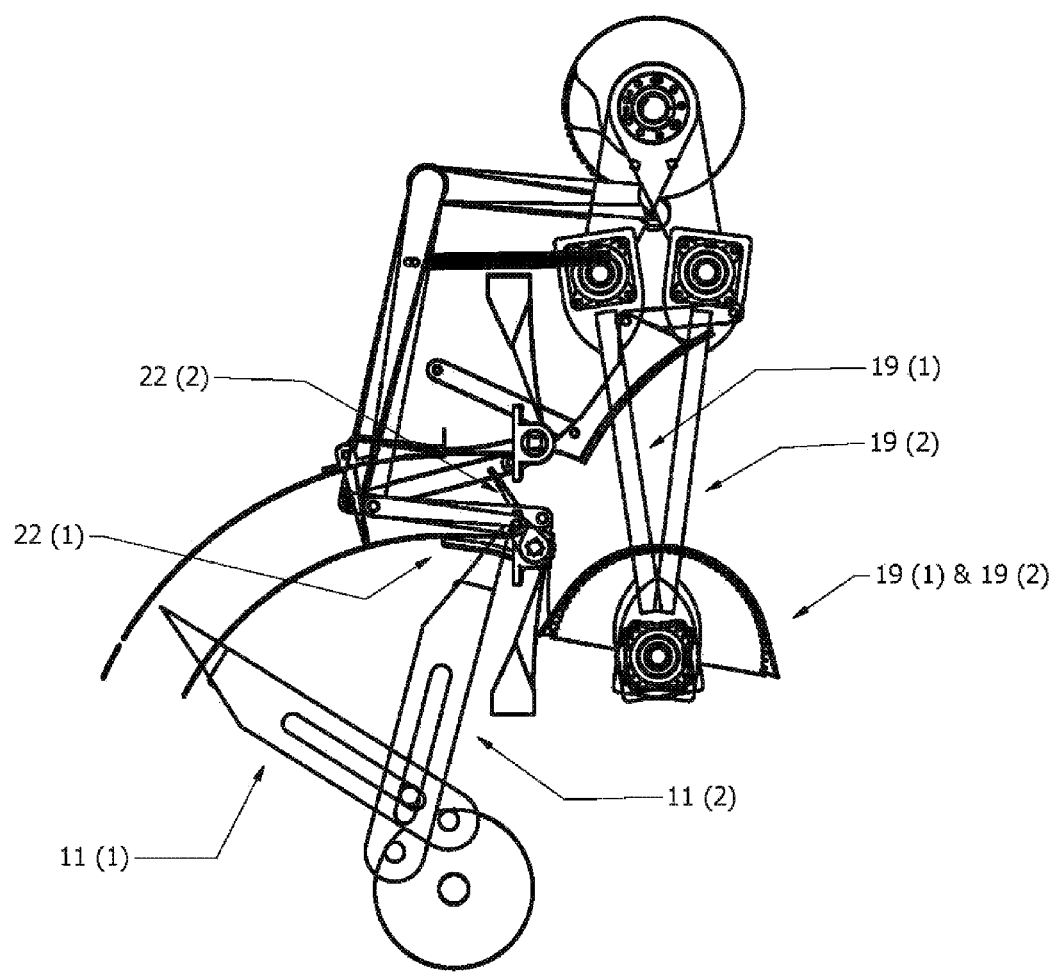
FIG. 3 shows the leaf stopper cutter and cams to operate the baler.
Figure 4:
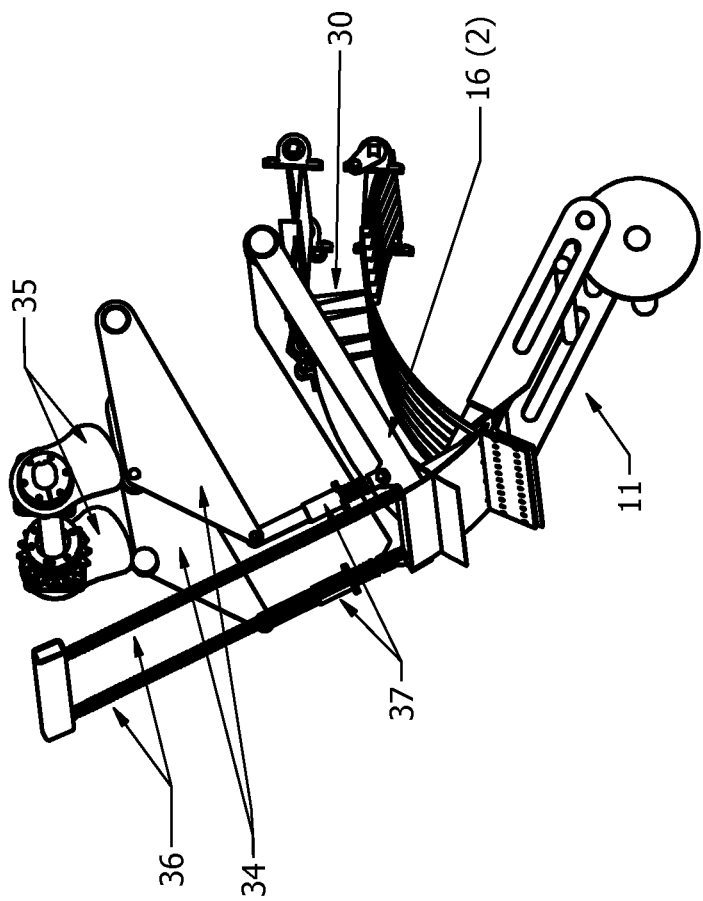
FIG. 4 shows the quick feed mechanism.

The preferred embodiments for the gates are best shown in FIG. 2. The lower gate 22 pivots about a point that is just in front of the leading edge of the semi cylinder roller 19 as it moves up and even with the bottom of the leaf forming chamber 12. It is rotated by the lower gate cam 8 on the semi cylinder crank shaft and by the lower gate drive linkages 17. When open, the lower gate 22 lies horizontal with the bottom of the leaf forming chamber 12. When the lower gate 22 is closed the leading edge of the gate is flush with the middle section of the upper hay guide 15. The lower gate 22 is forced closed by the action of the lower gate spring 29 and is forced open by the action of the lower gate cam 8. The same action is created by the upper gate 23 thru the upper gate cam 7 and the upper gate drive linkages 21. The upper gate 23 is rotated about a position just forward of the leading edge of the semi cylinder roller 19 as it moves downward, and even with the top of the leaf forming chamber 12. A spring forces the upper gate 23 closed to where the leading edge is flush with the middle section of the lower hay guide 25. The upper gate 23 is forced open by the upper gate cam 7 until it is horizontal with the top of the leaf forming chamber 12. The timing of the opening and closing of the gates is controlled by the angular position and shape of the cams. The lower gate 22 closes right after a section of leaf has been placed above the semi cylinder roller 19. The lower gate 22 remains closed until the leading edge of the semi cylinder roller 19 has swept pass the gate. The lower gate 22 then opens. The upper gate 23 closes right after a section of hay has been placed below the semi cylinder roller 19 and remains closed until the leading edge of the semi cylinder roller 19 has swept pass the gate. Then the upper gate 23 opens.

The action of the upper hay guide 15 and lower hay guide 13 are best show in FIG. 2. The hay guides are divided into three sections. The first sections 26, 27 are permanently mounted to the frame and keep the hay on the curved side of the semi cylinder as the cylinder starts to move either up or down. These sections are between the leading edge of the semi cylinder roller 19 and the upper gate 23 or lower gate 22. Starting with the semi cylinder roller 19 in the bottom position the leading edge of the semi cylinder roller 19 first sweeps along the first section of the hay guide 27. Then the leading edge sweeps along the closed lower gate 22. The leading edge then sweeps along the middle section of the upper hay guide 24 which directs the hay towards the bale chamber. Once the leading edge of the semi cylinder roller 19 is past the middle section of the upper hay guide 24, the center tube of the semi cylinder roller 19 contacts the middle section of the upper hay guide 24 and pushes it out of the way. The movement of the middle section of the upper hay guide 24 is controlled by the linkages 14 pivotally connected to the hay guide and the frame of the baler. These linkages allow the middle section of the upper hay guide 24 to move upward by the contact of the center tube of the semi cylinder roller 19 and not collide with the first section of the lower hay guide 26. The opposing action is accomplished by the lower hay guide 13 and upper gate 23 as the semi cylinder roller 19 moves downward.

The weight of the middle section of the upper hay guide 24 will return it to its original position once the contact with the center tube of the semi cylinder roller 19 is no longer there. The middle section of the lower hay guide 25 is returned to its original position by springs 28 connected to the linkages and the baler frame.

The quick feed mechanism 11 is positioned to engage spikes into the leaf forming chamber 12 just behind the leaf stopper cutter 16 mechanism right after it has engaged. The quick feed mechanism 11 then moves the section of hay in the leaf forming chamber 12 to the compression area above or below the semi cylinder roller 19. The spikes travel through slots in the lower gate 22 to move the section of hay rearward enough to allow the gates to continue to move the hay into the compression area to allow the semi cylinder roller 19 to compress the leaf section as it moves either up or down. The quick feed mechanism 11 then disengages from the leaf forming chamber 12 and returns slowly to the place where the spikes can engage the hay just after the leaf stopper cutter 16 mechanism has engaged. The quick feed mechanism 11 motion is controlled by the quick feed shaft 10 and the quick feed stationary pivot. The rotation of the quick feed shaft is exactly twice the speed of the semi cylinder crank shaft and is synchronized to cause the leaf section to be placed in the center of the bales being made when the semi cylinder roller 19 is either up or down.

Figure 6:
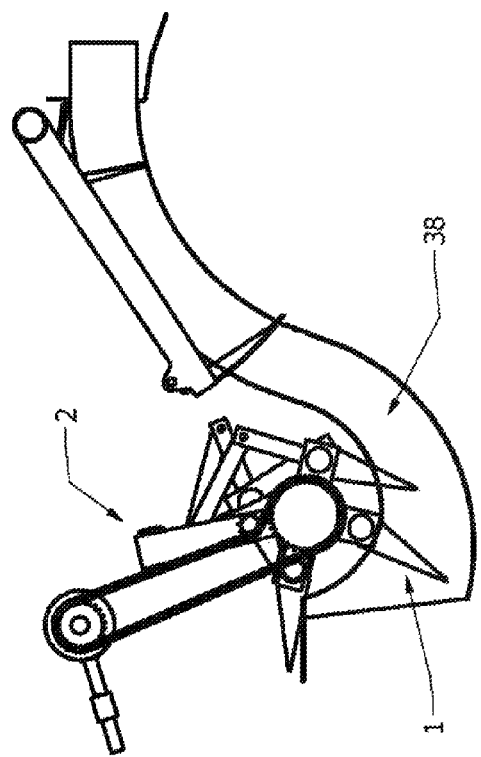
FIG. 6 shows the position of the stuffer finger control bar to allow for hay storage.

The leaf stopper cutter 16 mechanism as shown in FIG. 6 is positioned to cut the continuously formed leaf after the stuffer fingers have left the leaf forming chamber 12. The leaf stopper cutter 16 is engaged by cams 35 and the leaf stopper cutter linkages 34 on both sides of the secondary drive shaft 4. The secondary drive shaft 4 rotates at exactly twice the speed of the semi cylinder crank shaft and the exactly the same speed as the quick feed drive shaft. The leaf stopper cutter cam 35 is synchronized with the quick feed mechanism 11 to engage just as the spikes of the quick feed mechanism 11 are entering the leaf forming chamber 12. The leaf stopper cutter 16 remains in the leaf forming chamber 12 long enough to separate the new section of leaf from the continuous leaf being formed by the stuffer fingers. The leaf stopper cutter 16 is removed from the leaf forming chamber 12 by springs 36. The leaf stopper cutter 16 remains in for one cycle of the quick feed mechanism 11 when the tying cycle is engaged.

The cutting edge of the leaf stopper cutter 16 is sharp and designed to cut the hay by the angled cutting edges as it is engaged to stop the continuously formed leaf from proceeding along the leaf forming chamber 12.

Figure 5:
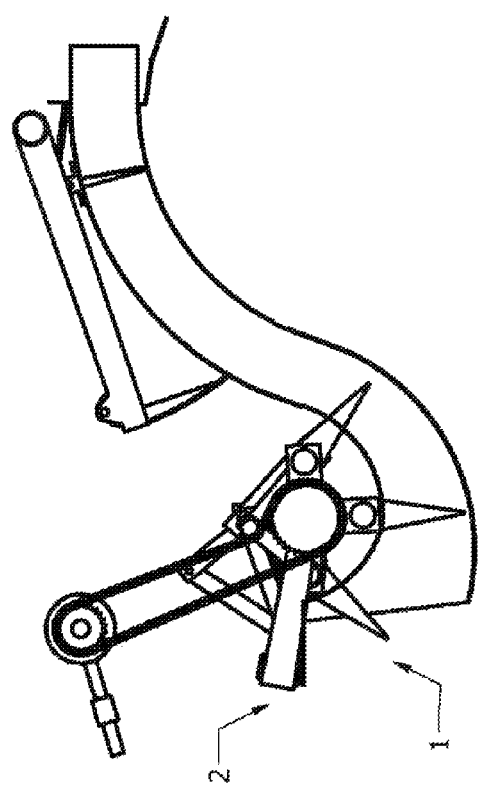
FIG. 5 shows the normal position of the stuffer finger control bar.

The stuffer finger control bar 2 is pivotally mounted to the stuffer finger crank shaft. The motion of the stuffer finger control bar 2 is shown in FIGS. 5 and 6. When the leaf stopper cutter 16 stays engaged by the leaf stopper cutter catch for one cycle of the quick feed mechanism 11, the computer sends a signal to retract the stuffer finger bar actuator allowing the stuffer bar to rotate backward to position 2 as shown in FIG. 6. This rotation allows for a leaf of hay to be stored at position 38 in the leaf forming chamber 12 while the bale in the bale chamber is being tied off. During normal operation the computer sends a signal to the stuffer finger bar actuator to extend incrementally for each cycle of the quick feed mechanism 11, forcing some of the stored leaf further along to where the quick feed mechanism 11 can place it into the compression area. More hay can be forced in the top or the bottom by this method to create a uniformed square bale.

The right and left hay paddles 30, 32 rotate out of the way as hay is being placed into the compression area by the quick feed mechanism 11. The hay paddles are returned to the home position by the right and left hay paddle springs 31, 33. If the same amount of hay is being placed into the compression area, the paddles will move out of the way at the same time. If more hay is being placed on the right or left side then the sensors will show that one of the paddles has moved out of the way sooner and therefore the computer will send a signal to the operator to drive the baler more to the left or right of the windrow. The hay paddles 30,32 will also keep track of how much hay has been put in the top or the bottom of the bale. If more hay has been placed in the top of the bale the computer will adjust how much hay is placed in the compression area by rotating the stuffer finger control bar 2 the right amount and direction to create an equal amount of hay being placed in the top and bottom of the bale.

A transmission 38 is placed between the right angle reduction gear box and the drives that operate the quick feed mechanism, leaf stopper cutter, the semi cylinder and the needle knotter mechanism. This transmission slows the speed of the middle baler to allow the tying mechanism to operate at a functional speed while allowing the rest of the baler to operate at its normal speed. This transmission has two speeds and a neutral. The neutral position is used to stop the operation of the middle baler if the computer through sensors determines mechanisms are no longer in synchronization.

What is claimed is:

1. A square baler comprising:
    a wheeled frame having a front end and a rear end, the front end having a hitch adapted for connecting the baler to a powered wheeled vehicle such that the vehicle is capable of pulling the baler through a field surface filled with crop;
    the front end further comprising an inclined surface having a lower edge located near the field surface such that as the baler is pulled over the field surface the crop is forced up the inclined surface;
    a leaf forming chamber mounted above the wheeled frame rearward of the inclined surface and forward of a bale chamber, the leaf forming chamber including a gate at a rearward end of the leaf forming chamber, the gate being selectively opened to permit crop to pass into the bale chamber from the leaf forming chamber, or selectively closed to not permit crop to pass into the bale chamber from the leaf forming chamber;
    a semi cylindrical compression roller slidably and rotatably mounted on a vertical mount structure located at the front of the bale chamber, the roller having a curved face with an arc length which is substantially as long as the height of the bale chamber;
    the roller being slidable between a low position near a bottom of the bale chamber, a high position near a top of the bale chamber, and a middle position located halfway between the high position and the low position and about level with a midpoint of the height of the of bale chamber;
    the roller being rotatable such that when it is located in the low position, the curved face is directed substantially upward, when it is located in the middle position the curved face is directed substantially rearward, and when it is located in the high position the curved face is directed substantially downward;
    whereby as the roller is slid upwardly from the low position toward the high position while the baler is being pulled forward, the curved face rotates from the upward facing direction through the rearward facing direction and to the downward facing direction, and whereby as the roller is slid downwardly from the high position toward the low position while the baler is being pulled forward, the curved face rotates from the downward facing direction through the rearward facing direction and to the upward facing direction;
    a feed mechanism adapted for moving piles of crop from the leaf forming chamber into the front of the bale chamber;
    whereby when the roller is positioned below the middle position, the feed mechanism moves a first pile of crop to a location above the curved face, and then, as the roller moves upwardly, the curved face compresses the first pile of crop rearwardly and upwardly in the bale chamber; and
    whereby when the roller is positioned above the middle position, the feed mechanism moves a second pile of crop to a location below the curved face, and then, as the roller moves downwardly, the curved face compresses the second pile of crop rearwardly and downwardly in the bale chamber.

2. The square baler of claim 1 in which the gate is pivotally connected to a wall of the leaf forming chamber.

3. The square baler of claim 1 in which the leaf forming chamber includes a second gate at a rearward end thereof for being selectively opened to permit crop to pass into the bale chamber from the leaf forming chamber, or selectively closed to not permit crop to pass into the bale chamber from the leaf forming chamber.

4. The square baler of claim 3 in the gate is connected to an upper wall of the leaf forming chamber and closes downwardly, and the second gate is connected to a lower wall of the leaf forming chamber and closes upwardly.

5. The square baler of claim 4 in which the gate is pivotally connected to the upper wall of the leaf forming chamber, and the second gate is pivotally connected to the lower wall of the leaf forming chamber.

6. The square baler of claim 3 in which the gate and the second gate are each pivotally connected to the leaf forming chamber.

7. The square baler of claim 4 including a leaf stopper cutter having a cutting edge, the leaf stopper cutter configured to enter the leaf forming chamber forward of the feed mechanism and cut crops with the cutting edge, whereby the leaf stopper cutter also barricades and stops the movement of crops into the leaf forming chamber when the leaf stopper cutter is engaged into the leaf forming chamber.

8. The square baler of claim 1 in which the gate is connected to an upper wall of the leaf forming chamber and closes downwardly.

9. The square baler of claim 8 including a leaf stopper cutter having a cutting edge, the leaf stopper cutter configured to enter the leaf forming chamber forward of the feed mechanism and cut crops with the cutting edge, whereby the leaf stopper cutter also barricades and stops the movement of crops into the leaf forming chamber when the leaf stopper cutter is engaged into the leaf forming chamber.

10. The square baler of claim 1 in which the gate is connected to a lower wall of the leaf forming chamber and closes upwardly.

11. The square baler of claim 10 including a leaf stopper cutter having a cutting edge, the leaf stopper cutter configured to enter the leaf forming chamber forward of the feed mechanism and cut crops with the cutting edge, whereby the leaf stopper cutter also barricades and stops the movement of crops into the leaf forming chamber when the leaf stopper cutter is engaged into the leaf forming chamber.

12. The square baler of claim 1 including a leaf stopper cutter having a cutting edge, the leaf stopper cutter configured to enter the leaf forming chamber forward of the feed mechanism and cut crops with the cutting edge, whereby the leaf stopper cutter also barricades and stops the movement of crops into the leaf forming chamber when the leaf stopper cutter is engaged into the leaf forming chamber.

13. The square baler of claim 1 including a plurality of stuffer fingers positioned above the inclined surface, the stuffer fingers being rotated in a direction to drive crop up the inclined surface to the leaf forming chamber; and
a stuffer finger pivotal control bar that controls the distance of the stuffer fingers from the inclined surface, such that the stuffer fingers are close enough to the inclined surface to drive crops up the inclined surface when the stuffer finger pivotal control bar is in a first position, and such that the stuffer fingers are elevated from the inclined surface and do not drive the crop up the inclined surface when the stuffer finger pivotal control bar is in a second position.

14. The square baler of claim 4 including a plurality of stuffer fingers positioned above the inclined surface, the stuffer fingers being rotated in a direction to drive crop up the inclined surface to the leaf forming chamber; and
a stuffer finger pivotal control bar that controls the distance of the stuffer fingers from the inclined surface, such that the stuffer fingers are close enough to the inclined surface to drive crops up the inclined surface when the stuffer finger pivotal control bar is in a first position, and such that the stuffer fingers are elevated from the inclined surface and do not drive the crop up the inclined surface when the stuffer finger pivotal control bar is in a second position.

15. The square baler of claim 12 including a plurality of stuffer fingers positioned above the inclined surface, the stuffer fingers being rotated in a direction to drive crop up the inclined surface to the leaf forming chamber; and
a stuffer finger pivotal control bar that controls the distance of the stuffer fingers from the inclined surface, such that the stuffer fingers are close enough to the inclined surface to drive crops up the inclined surface when the stuffer finger pivotal control bar is in a first position, and such that the stuffer fingers are elevated from the inclined surface and do not drive the crop up the inclined surface when the stuffer finger pivotal control bar is in a second position.

16. A square baler comprising:
a wheeled frame having a front end and a rear end, the front end having a hitch adapted for connecting the baler to a powered wheeled vehicle such that the vehicle is capable of pulling the baler through a field surface filled with crop;
the front end further comprising an inclined surface having a lower edge located near the field surface such that as the baler is pulled over the field surface the crop is forced up the inclined surface;
a leaf forming chamber mounted above the wheeled frame rearward of the inclined surface and forward of a bale chamber;
a semi cylindrical compression roller slidably and rotatably mounted on a vertical mount structure located at the front of the bale chamber, the roller having a curved face with an arc length which is substantially as long as the height of the bale chamber;
the roller being slidable between a low position near a bottom of the bale chamber, a high position near a top of the bale chamber, and a middle position located halfway between the high position and the low position and about level with a midpoint of the height of the of bale chamber;
the roller being rotatable such that when it is located in the low position, the curved face is directed substantially upward, when it is located in the middle position the curved face is directed substantially rearward, and when it is located in the high position the curved face is directed substantially downward;
whereby as the roller is slid upwardly from the low position toward the high position while the baler is being pulled forward, the curved face rotates from the upward facing direction through the rearward facing direction and to the downward facing direction, and whereby as the roller is slid downwardly from the high position toward the low position while the baler is being pulled forward, the curved face rotates from the downward facing direction through the rearward facing direction and to the upward facing direction;
a feed mechanism adapted for moving piles of crop from the leaf forming chamber into the front of the bale chamber;
a leaf stopper cutter having a cutting edge, the leaf stopper cutter configured to enter the leaf forming chamber forward of the feed mechanism and cut crops with the cutting edge, whereby the leaf stopper cutter also barricades and stops the movement of crops into the leaf forming chamber when the leaf stopper cutter is engaged into the leaf forming chamber;
whereby when the roller is positioned below the middle position, the feed mechanism moves a first pile of crop to a location above the curved face, and then, as the roller moves upwardly, the curved face compresses the first pile of crop rearwardly and upwardly in the bale chamber; and whereby when the roller is positioned above the middle position, the feed mechanism moves a second pile of crop to a location below the curved face, and then, as the roller moves downwardly, the curved face compresses the second pile of crop rearwardly and downwardly in the bale chamber.

17. A method of loading hay into a bale chamber and forming a square bale of hay comprising the steps of:

moving a continuous feed supply of hay from an inclined pickup surface to a leaf forming chamber, the hay being driven up the inclined pickup surface by a plurality of rotating stuffer fingers;

entering a leaf stopper cutter into the leaf forming chamber to cut a first pile of hay from the continuous feed supply of hay;

engaging a feed mechanism to feed the first pile of hay from the leaf forming chamber to a bale chamber, the bale chamber having a rotating, semi-cylindrical compression roller, the roller being positioned in an upper position such that the first pile of hay enters the bale chamber below the roller;

exiting the leaf stopper cutter from the leaf forming chamber;

closing a gate positioned at a rearward end of the leaf forming chamber to close off the bale chamber from the leaf forming chamber;

lowering the roller from the upper position to a lower position and rotating the roller in such a manner that the first pile of hay is compressed downwardly and rearwardly in the bale chamber;

entering the leaf stopper cutter into the leaf forming chamber to cut a second pile of hay from the continuous feed supply of hay;

opening the gate;

engaging the feed mechanism to feed the second pile of hay from the leaf forming chamber to the bale chamber, the second pile of hay entering the bale chamber above the roller which is in the lower position;

closing the gate to close off the bale chamber from the leaf forming chamber; and raising the roller from the lower position to the upper position and rotating the roller in such a manner that the second pile of hay is compressed upwardly and rearwardly in the bale chamber.

18. The method of claim 17 including the step of elevating the rotating stuffer fingers from the inclined pickup surface when the leaf stopper cutter is entered into the leaf forming chamber so as to stop the rotating stuffer fingers from driving the hay up the inclined pickup surface when the leaf stopper cutter blocks entry of hay into the leaf forming chamber.

\* \* \* \* \*